US008132017B1

(12) United States Patent
Lewis (10) Patent No.: US 8,132,017 B1
(45) Date of Patent: Mar. 6, 2012

(54) METHOD AND APPARATUS FOR SECURELY SYNCHRONIZING PASSWORD SYSTEMS

(75) Inventor: Christopher Raymond Lewis, Dunrobin (CA)

(73) Assignee: Nortel Networks Limited, Mississauga, Ontario (CA)

( * ) Notice: Subject to any disclaimer, the term of this patent is extended or adjusted under 35 U.S.C. 154(b) by 1704 days.

(21) Appl. No.: 10/403,690

(22) Filed: Mar. 31, 2003

(51) Int. Cl. *G06F 21/00* (2006.01)

(52) U.S. Cl. ............ 713/183; 713/155; 713/184; 726/2; 726/5; 726/8; 726/7; 726/18; 726/19; 726/27; 380/255; 380/274; 705/18; 705/72

(58) Field of Classification Search ............... 713/183, 713/155, 184; 726/5, 26, 6, 3, 7, 8, 18, 19, 726/27, 2; 380/255, 274; 705/18, 72

See application file for complete search history.

(56) References Cited

U.S. PATENT DOCUMENTS

| | | | | |
|---|---|---|---|---|
| 5,862,323 A * | 1/1999 | Blakley et al. | ................... | 726/13 |
| 5,867,646 A * | 2/1999 | Benson et al. | ..................... | 726/4 |
| 6,178,511 B1 * | 1/2001 | Cohen et al. | ....................... | 726/6 |
| 6,240,184 B1 * | 5/2001 | Huynh et al. | ................. | 380/206 |
| 6,324,267 B1 * | 11/2001 | Hraster et al. | ............ | 379/93.02 |
| 6,732,277 B1 * | 5/2004 | Vandergeest et al. | ........... | 726/19 |
| 6,986,038 B1 * | 1/2006 | Leah et al. | ..................... | 713/155 |
| 6,986,039 B1 * | 1/2006 | Leah et al. | ..................... | 713/155 |
| 7,036,142 B1 * | 4/2006 | Zhang et al. | ..................... | 726/12 |
| 7,185,360 B1 * | 2/2007 | Anton et al. | ....................... | 726/3 |
| 7,676,829 B1 * | 3/2010 | Gui et al. | ........................... | 726/5 |
| 2002/0138763 A1 | 9/2002 | Delany et al. | | |
| 2003/0140258 A1 * | 7/2003 | Nelson et al. | ................. | 713/202 |
| 2003/0195845 A1 * | 10/2003 | Anton et al. | ..................... | 705/40 |
| 2004/0158743 A1 * | 8/2004 | Ham et al. | ..................... | 713/201 |
| 2007/0124802 A1 * | 5/2007 | Anton et al. | ....................... | 726/3 |

\* cited by examiner

*Primary Examiner* — April Shan

(74) *Attorney, Agent, or Firm* — Anderson Gorecki & Manaras LLP (57) ABSTRACT

A centralized password repository (CPR) provides network users with a password portal through which the user can manage password access to domains and applications on the network. A subset of the domains and applications on the network may be required, by design, to maintain a separate password infrastructure. For these systems, the CPR establishes a secure and authenticated communication channel and software on the system interfaces with the password infrastructure to synchronize the password in the system password infrastructure with the password in the CPR. For other systems not required to maintain a separate password infrastructure, the CPR performs password services by responding to requests from those systems seeking to validate user IDs and passwords. The CPR enables an administrator to modify network privileges and enables a user to alter passwords on the network through a single interface.

8 Claims, 4 Drawing Sheets

METHOD AND APPARATUS FOR SECURELY SYNCHRONIZING PASSWORD SYSTEMS

BACKGROUND OF THE INVENTION

1. Field of the Invention

The present invention relates to network access and, more particularly, to a method and apparatus for providing a password interface to multiple password domains.

2. Description of the Related Art

Data communication networks may include various computers, servers, nodes, routers, switches, hubs, proxies, and other devices coupled to and configured to pass data to one another. These devices will be referred to herein as "network devices." Data is communicated through the data communication network by passing data packets (or data cells or segments) between the network devices by utilizing one or more communication links. A particular packet may be handled by multiple network devices and cross multiple communication links as it travels between its source and its destination over the network.

The various network devices on the communications network communicate with each other using predefined sets of rules, referred to herein as protocols. Different protocols are used to govern different aspects of the communication, such as how signals should be formed for transmission between network devices, various aspects of what the data packets should look like, and how packets should be handled by the network devices.

In a large networks, portions of the network may be configured to interconnect subsets of the total number of computers or network devices operating on the network. It is also not uncommon for each portion, or domain, to use different communication protocols and interconnect computers running different operating systems.

Conventionally, each domain attempts to maintain security by requesting users attempting to access resources on the domain to authenticate their identity utilizing a password. Passwords for valid users are stored in a password database managed by a local password database management system. Likewise, applications running within the domain may have their own password access portals to restrict access to the particular application.

On a large corporate network, including dozens or hundreds of domains and hundreds of applications, maintenance of the large number of password databases may get prohibitively expensive. Specifically, any time user privileges associated with a particular user are modified those modifications must be propagated to all password databases associated with systems (applications or domains) to which the user has been granted privileges. Additionally, employing multiple password databases requires the user to remember multiple passwords, possibly dictated by rules imposed by the network administrator for the particular domain or application. These large number of password infrastructures inevitably leads to a reduction in security, since an user is unlikely to be able to remember a large number of passwords, and thus is likely to keep a written list of passwords for the various systems available at their desk. The large number of password infrastructures also requires a large service department, since each password database will need to be maintained by an administrator, and the help desk will need to interface with users that have lost or forgotten their passwords for the various systems. Accordingly, it would be advantageous to have a mechanism for allowing a network user to utilize a single password for access to the disparate network resources.

SUMMARY OF THE INVENTION

The present invention overcomes these and other drawbacks by enabling multiple password domains to be synchronized and to provide the network user with a password portal through which the user can manage password access to associated domains and applications. Where the domain/application does not maintain a separate password infrastructure, the central password repository acts as a password infrastructure for that domain/application. Where the domain/application is required to maintain its own password infrastructure, the central password repository interfaces with the password infrastructure on the application/domain to cause password modifications and privilege alterations entered into the centralized database to be synchronized on the network so that the various separate password databases are up to date.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

As described in greater detail below, the method and apparatus of the present invention enables multiple password domains to be synchronized and to provide the network user with a password portal through which the user can manage password access to associated domains and applications. Where the domain/application does not maintain a separate password infrastructure, the central password repository acts as a password infrastructure for that domain/application. Where the domain/application is required to maintain its-own password infrastructure, the central password repository synchronizes password modifications and privilege alterations so that the separate password databases are up to date.

Figure 1:
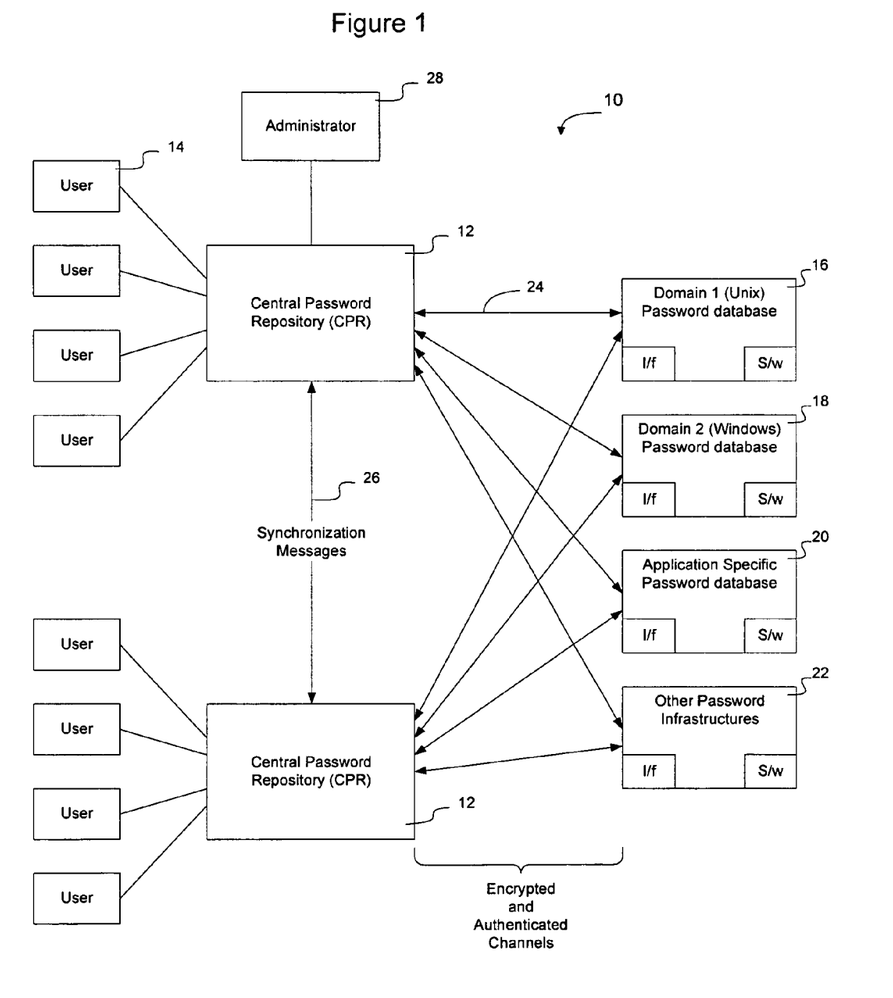
FIG. 1 is a functional block diagram of an example of a network configured according to an embodiment of the invention.

FIG. 1 illustrates a functional block diagram of a network 10 including a Centralized Password Registration and Administration System (CPR&AS). As shown in FIG. 1, the CPR&AS 10 includes a Central Password Repository (CPR) 12 that is configured to maintain password information for all registered users. Users 14 access the CPR 12 through a standard web browser interface or other conventional manner. The CPR is configured to interface with domains 16, 18, application 20, and any other potential infrastructures 22 that may contain a password database or require password services. Communications between the CPR and domains/applications is accomplished via encrypted and authenticated channels 24. As used herein, the term "system" encompasses both domains and applications.

Optionally, as shown in FIG. 1, a given network 10 may have multiple CPR network devices operating in parallel to provide password services to the network and the users. This allows the CPR network devices to be geographically distributed, if desired, and provides redundancy in the centralized password registration and administration system.

In one embodiment, the CPRs run as peers, each maintaining a full database of passwords and each capable of making modifications to the password database. Synchronization messages 26 are passed between the CPRs to ensure each CPR maintains an updated database. By enabling the CPRs to run as peers, each is able to make modifications to the database without requiring confirmation/approval from a master CPR.

An administrator 28 has access to the CPR to make changes to the database, add users, and take any other actions commonly associated with administrative privileges.

The CPR 12 is configured to operate in several manners, depending on the requirements of the domain or application. For example, Windows domains and Unix domains, cannot operate without maintaining a separate password database without significant modification. In this instance, the CPR 12 allows the domain to maintain its own password database, but operates as an interface to the domain's password database to synchronize password changes and other modifications across the various independent databases. Synchronization across multiple databases enables the administrator to affect user privileges on the whole network by accessing a central location. Synchronization also enables the user 14 to affect a password change on all associated domains by making a change to the one central database.

Alternatively, for those systems that do not need to maintain a separate password database to operate effectively, the CPR provides password services to the systems by responding to password requests to validate and authenticate users seeking to use the system resources. Standard RADIUS requests, LDAP-Bind requests, or other requests, may be made to authenticate a user. Each of these manners of operation will be discussed in greater detail below.

Figure 2:
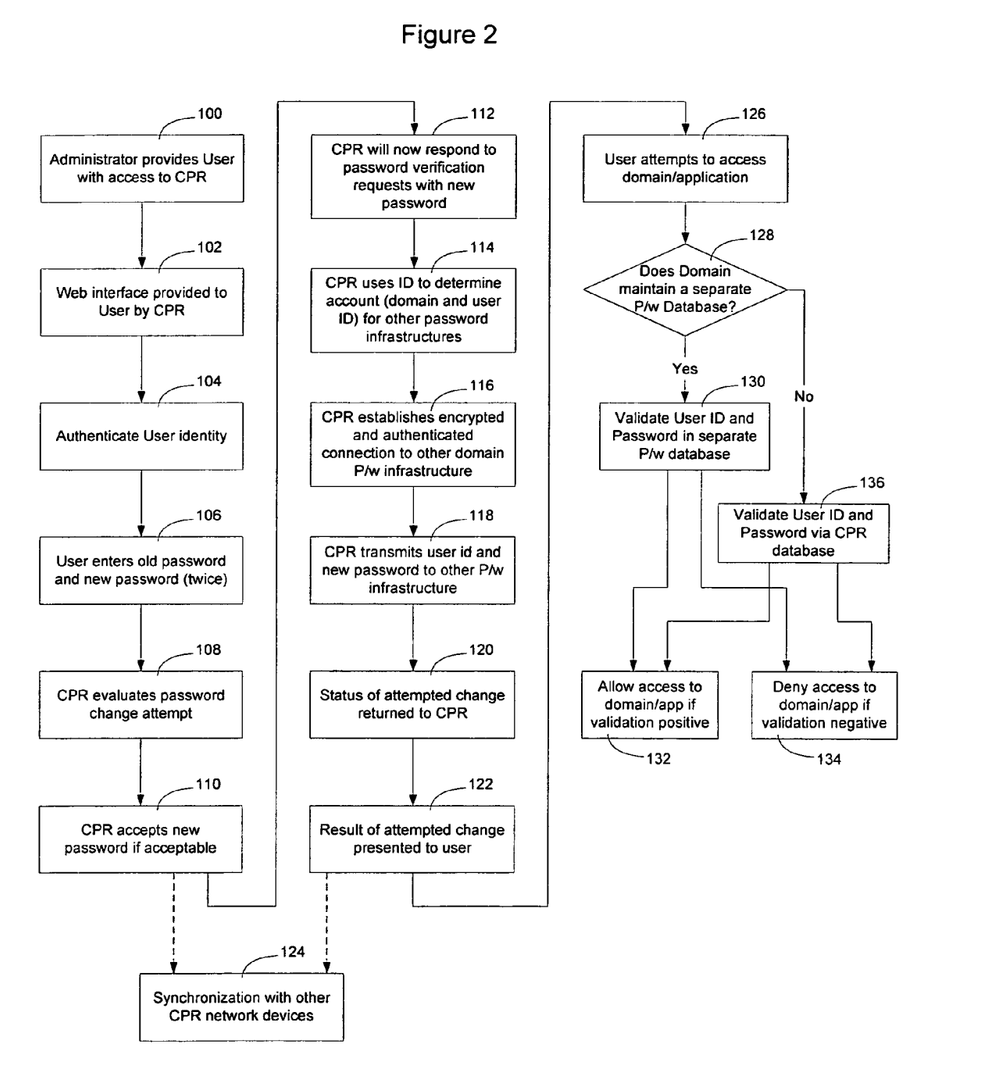
FIG. 2 is a flow chart of an example of software that may be used to implement embodiments of the invention.

FIG. 2 illustrates software configured to operate on the CPR 12 to enable a user to change a password, the CPR system to synchronize the changed password with other password systems, and to enable the CPR system to respond to password requests from systems that do not maintain an independent password database. The invention is not limited to this particular example, but rather extends beyond this one particular illustrated embodiment to encompass other systems similarly configured to affect user access privileges on the network.

As shown in FIG. 2, initially, the administrator 28 provides the CPR 12 with information 100 to enable a new user to access the CPR and establish a personalized password on the network 10. Any conventional manner of establishing a new user in the CPR's password database may be used and the invention is not limited to any particular manner of initially providing an user with access to the CPR 12. The administrator may wish to provide an user with access to the CPR for any number of reasons, for example where the user is new to the network, where the user has forgotten a previous password, or where the CPR system is first being introduced to the network 10.

In the embodiments illustrated herein, the CPR is configured to handle authentication services, and another network device or the systems are configured to handle authorization. Thus, the CPR, in the illustrated embodiments, is not configured to provide information as to the user's abilities to obtain access to systems on the network, but rather is configured to authenticate to the various systems that the user is who it purports to be. Authorization services may be handled by another network device or service, by the systems themselves, or, optionally, may be incorporated into the CPR system via appropriate modifications. The invention is not limited by how authorization services are provided on the network.

After the user's account has been established in the CPR system, the user has the ability to access the CPR system to manage passwords on the network 10. When the user wishes to access the CPR system to set or change a password, the user indicates its intention by accessing the system and is provided with a web interface 102 to interface the user to the CPR system.

The user then authenticates its identity by entering a valid user ID and password 104. Optionally, depending on the level of authentication required by the CPR system, the user may be required to only enter a Personal Identification Number or, where heightened authentication is required, a two factor authentication procedure may be required. As discussed in greater detail below, two factor authentication may involve use of a token plus password, or another secondary factor such as biometric validation or electronic certificate. The invention is not limited to the particular manner selected to authenticate the user.

After the user's identity has been authenticated, the user is allowed to take action on the password database maintained by the CPR system. For example, the user may wish to change the password to a alphanumeric code that is more easy for the user to remember. To enable the user to take action on the database, the CPR system provides the user with an interface that has fields to allow entry of the user's old password and the new password 106 and optionally any other information deemed important by the administrator. To prevent typographic mistakes from being entered as a new password, the CPR system may require the user to enter the new password multiple times.

Upon receipt of the required data, the CPR evaluates the attempted password change 108, for example by ascertaining whether the old password entered by the user matches the old password in the database, whether the new password has been typed in correctly, and optionally whether the new password meets rules associated with password selection set by the network administrator. For example, the network administrator may require the password to have a certain number of alphanumeric characters, no discernable words, and at least one numeral to qualify as a valid password. Any number of restrictions may be placed on the password to make the password more difficult to guess via a brute force attack. If the attempt is successful 110, the new password is entered into the CPR password database. Otherwise, the user is notified that the attempt was unsuccessful and optionally provided with the reason for the failure and an opportunity to re-attempt to alter the password.

After the user has successfully modified the password database, the CPR will respond with the new password to inquiries 112 from domains and applications seeking password information about the user.

Additionally, the CPR system takes action to synchronize the new password information with other password databases on the network so that a consistent password is used across the network as a whole for the user. Synchronizing the password across disparate domains and applications enables the user to use a single password for systems running on the network, thus minimizing the likelihood that the user will forget their password for a given system.

To synchronize passwords across the multiple password databases, the CPR ascertains which password databases need to be updated 114. In one embodiment, this is accomplished by sending a query to each of the password databases known to the CPR to inquire whether the user associated with a particular user ID has an account on that particular system. Where the user ID is the same on all systems on the network, this may be accomplished via a protocol exchange with the other system to ascertain whether the user exists on that system. Where the user ID is not the same on all systems on the network, the CPR maintains a table of user IDs in use on the various domains and supplies the domain-specific user ID when inquiring whether the particular user still has privileges on that domain or application. In another embodiment, the CPR maintains a list of systems to which the user has access and which also maintain an independent password infrastructure.

Once the CPR has ascertained that one or more password databases on the network need to be updated, the CPR will establish an encrypted and authenticated connection to the other system password infrastructure 116. The communications between the CPR and the other password infrastructure are encrypted, in this embodiment, to prevent the user's password from being visible to third parties on the network. In one embodiment, Secure Socket Layer (SSL) encryption is used to encrypt communications between the CPR and the other password infrastructure. The invention is not limited to use of this type of encryption, however, as numerous other encryption methods may be used as well. Several examples of possible alternative types of encryption protocols include Transport Layer Security (TLS), Private Communications Technology (PCT), Secure HTTP (SHTTP), Internet Protocol Security (IPsec), and Internet Key Exchange (IKE). This list is not exhaustive and the invention is not limited to the particular examples set forth in this list.

The communication between the CPR and the other password infrastructure is also authenticated to enable the other password infrastructure to trust the CPR that the CPR has received authorization to make the change from the user. This prevents malicious applications from assuming the CPR's identity to alter passwords on the network.

The level of authentication may vary depending on the application or domain's requirements. A low level of authentication may be sufficient for applications without significant access to personal or sensitive information. For example, a benefits web server that maintains benefits information for employees may enable the employees to access the benefits information by entering their user ID and personalized identification number (PIN). In this situation, since the material accessed by the password database is protected by a relatively low level of authentication (ID+PIN) the same level of authentication should be sufficient to alter passwords on the application database.

A mid-level of authentication typically involves requiring a user to input a unique user ID and a password. This level of authentication is used by most domains and applications on the network as it provides a good compromise between security and user inconvenience.

Higher levels of authentication may be required as well, as specified by the system. For example, a system may contain extremely sensitive information, such as the company's most valuable trade secrets. In this instance, a very high level of authentication may be required to access the content of the system. Examples of heightened authentication requirements typically involve two factor authentication, such as a password and token. Examples of tokens include smart cards or SecurID cards that may be read directly by the computer system or which display a changing number that is typed into the computer system similar to a password. Tokens may also be used in a challenge/response authentication system in which the computer sends an alphanumeric code to the user, the user enters the code into the token which generates a response based on the code, and the response is input to the computer and used by the computer to authenticate the user. Optionally, alternatives to tokens, such as biometrics, may be used to authenticate the user.

Where the domain or application requires a higher level of authentication, the domain will specify to the CPR the level of authentication. Where the proper level of authentication was not received from the user during the process of modifying information on the database, the CPR may notify the user and require the user to re-authenticate its identity in compliance with the heightened authentication requirements specified by the system.

In one embodiment, certificates are exchanged between the CPR and password infrastructure to authenticate the user. The invention is not limited to utilizing certificates, however, and rather extends to all manners of authenticating the user to the password infrastructure. For example, in one alternative embodiment, the CPR obtains the required authentication from the user and passes the information, over the network to the password infrastructure for verification/authentication. The transmission of the authentication information in an encrypted manner enables the password infrastructure to ensure it has received the proper level of authentication before accepting password information from the CPR. In another embodiment, the CPR will request the user to input valid authentication information and will perform the authentication check with the user. In this embodiment, the password infrastructure relies on the CPR to perform proper authentication before sending password modification information over the secure channel.

Once the encrypted and authenticated channel has been established, the CPR transmits the user ID and new password to the other password infrastructure 118. There are two ways of causing the change: performing a password change or performing a password reset.

If the CPR wishes to engage in a password change transaction to change a password on the system password infrastructure, the CPR issues a command: for user X, if existing password is A, change password to B. Because changing a password using the password change instruction requires prior knowledge of user X's password on the password infrastructure, this command works well only where the password database in the password infrastructure and password database in CPR have been previously synchronized or where knowledge of the password on the system password infrastructure has been previously disseminated to the CPR.

The second way of altering a password on the system password infrastructure is to perform a reset function on the password database of the domain/application password infrastructure. Performing a reset function on the password database forces the password database to accept the new password for the user regardless of what the old password was. Hence, performing a password reset, using the new password as the reset value, will work in situations where the CPR database and the password infrastructure database have not been previously synchronized.

The password infrastructure, upon receiving the password change or password reset command over the encrypted and authenticated communication channel, will apply the change or reset command to its database, and return a status message to the CPR, e.g. change accepted, change rejected 120. Optionally, if the change is rejected, the CPR may attempt a second time to reset the password on the password database to the new value. Once the CPR has received acknowledgements from each of the password infrastructures that the new password has been accepted or finally rejected, the CPR will present the results of the attempted change to the user 122.

In a typical network setting it may be desirable to have redundant CPRs so that the network is not without access to the centralized password repository in the event of a failure associated with the CPR, the network, or the machine hosting the CPR. Accordingly, any change to the CPR's database is communicated to the other CPRs running on the network to enable each CPR to have access to the most recent data.

In one embodiment, synchronization messages are sent between CPRs 124 every time a change is made to the database. In another embodiment, CPR synchronization messages are sent out periodically and each synchronization message contains information of all changes to the database since transmission of the last synchronization message.

In either embodiment, the synchronization messages, according to one embodiment of the invention, include a time stamp associated with the database change to enable the CPRs to only apply the most recent updates to their databases. For example, assume a password change for user X was entered at time=T1 on a first CPR, and a different password change was entered at time=T1+1 sec. on a second CPR. In this example synchronization messages from both CPRs will be propagated to the other CPRs on the network. Upon receipt of the synchronization messages, the CPRs will be able to ascertain when each transaction occurred and update their resident database with the most recent password change. One of the first and second CPRs will also update its database a second time to reflect the most recent password entry for the user. The CPRs will either ignore the message with the older time stamp or will record the password change in a history record for the user so that the CPR may maintain a log of all passwords historically used by the user on the network.

Exchange of synchronization messages between CPRs may take place at several logical stages during the process of updating a user's password. For example, synchronization 124 may occur as soon as the CPR accepts the new password. By causing the synchronization message to be transmitted to the other CPRs upon acceptance of the new password by CPR system, each CPR will be able to respond to request from systems that do not maintain their own password infrastructure. Alternatively, or additionally, synchronization 124 between CPR databases may be performed upon completion of the synchronization processes with the other password infrastructures.

In operation, after a password change has been made through the CPR system, the user will use the new password to access domains and applications on the network. The process followed when an user makes an attempt to access a domain/application 126 will depend on whether the system maintains a separate password database 128. If the system has a separate password infrastructure, it will query its password database using the user ID and password, and possibly enhanced or decreased user authentication information, to ascertain if the user ID and authentication information is valid 130. If the result of the attempted validation is positive, the user will be provided access to the domain/application 132, and if not the user will be denied access to the domain/application 134.

If the system does not have a separate password infrastructure, the system will obtain the user ID and password, or other authentication information, and pass the user credentials to the CPR for validation 136. If the result of the CPR validation attempt is positive, the user will be allowed access to the domain/application 132, and if not it will be denied access to the domain/application 134.

Systems without a separate password infrastructure may use standard or proprietary authentication protocols to present validation requests to the CPR system. For example, in one embodiment, the CPR system is configured to respond to RADIUS (Remote Authentication Dial In User Service) requests. In this embodiment, a domain or application can formulate a RADIUS request using the user's ID and password, transmit the RADIUS request to the CPR system, and receive a response from the system.

In another embodiment, the CPR system is configured to respond to LDAP-Bind (Lightweight Directory Access Protocol—Bind) requests. LDAP-Bind is a form of authenticated LDAP which enables an application to verify with a LDAP server an user's identity. LDAP-bind works well over SSL and hence enables encrypted authentication of an user attempting to access the resource. Since many applications know how to perform LDAP requests this provides a convenient mechanism for interfacing these applications to the CPR system. Other authentication protocols may be used as well, such as the Kerberos protocol available from MIT, Point to Point Protocol (PPP) which has several authentication extensions, and other commonly known protocols or proprietary protocols. The invention is not limited to the use of any particular authentication protocol.

Figure 3:
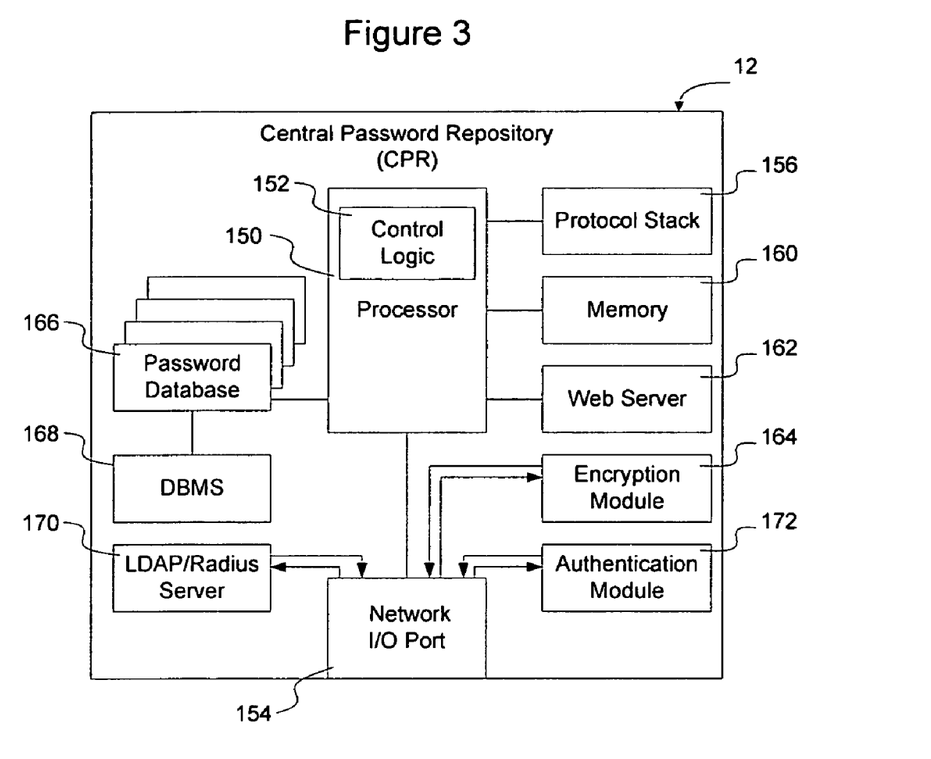
FIG. 3 is a functional block diagram of an example of a Central Password Repository (CPR) according to an embodiment of the invention.

FIG. 3 illustrates one embodiment of a Central Password Repository Network Device CPR 12 according to an embodiment of the invention. As illustrated in FIG. 3, the CPR 12 contains a processor 150 having control logic 152 configured to implement the functions ascribed to it as described above in connection with FIGS. 1-2. The CPR 12 also includes network I/O ports 154 configured to enable it to communicate with domains, applications, other CPR systems, and the administrator over the network. Interactions on the network 10 and during protocol exchanges with other network devices on the network may be facilitated through the implementation of a protocol stack 156 containing instructions and data relevant to communications protocols commonly used on the network and by the network devices.

A memory 160 contains data and/or instructions for use by the control logic to enable it to perform the functions required of it to participate in communicating with the administrators, users, and other network devices.

A web server module 162 is configured to provide a standard web interface to the user to enable the user to interact with the CPR system in an user-friendly manner. Specifically, the web server module 162 in one embodiment, may be configured to present web pages containing XML and/or HTML tags to enable the user to view password and optionally other account information currently in the database, to submit new information for inclusion in the database, and optionally to perform other desired actions on the database.

An encryption module 164 may be provided to encrypt traffic between the user 14 and CPR 12, and between the CPR 12 and domains and applications 16-22.

A password database 166 and attendant DataBase Management System (DBMS) 168 are used to store and access records containing user names, ID numbers, passwords, and optionally other information associated with the user such as a list of systems used by the user and other user IDs that the user uses on other systems. Any convenient database may be used to implement the password database, including a relational database accessed via Structured Query Language (SQL). For example, the CPR could utilize an indexed database in a UNIX native NDBM database. The invention is not limited to this particular example or any other particular technology implemented to store the database.

An LDAP/RADIUS server 170 is provided to handle LDAP-Bind and RADIUS transactions with domains and applications that do not maintain their own password infrastructure. Similarly, an authentication module 172 is provided to handle transactions with domains and applications that do not maintain their own password infrastructure. For certain systems, downloadable one-way encrypted password mappings, for example encrypted using UNIX crypt and MD5 hash, may be provided to the requesting systems, although the invention is not limited in this regard. Other systems may choose to communicate using known or proprietary protocols, including the Kerberos protocol, Point to Point Protocol (PPP), OPT-S/Key, Transport Layer Security (TLS), Simple Authentication and Security Layer (SASL), UNIX Pluggable Authentication Module (PAM), or other available or proprietary authentication protocols. The particular protocol or protocols supported by the CPR network device may vary depending on the needs of the systems on the network and the invention is not limited to implementation of any particular authentication protocol.

Figure 4:
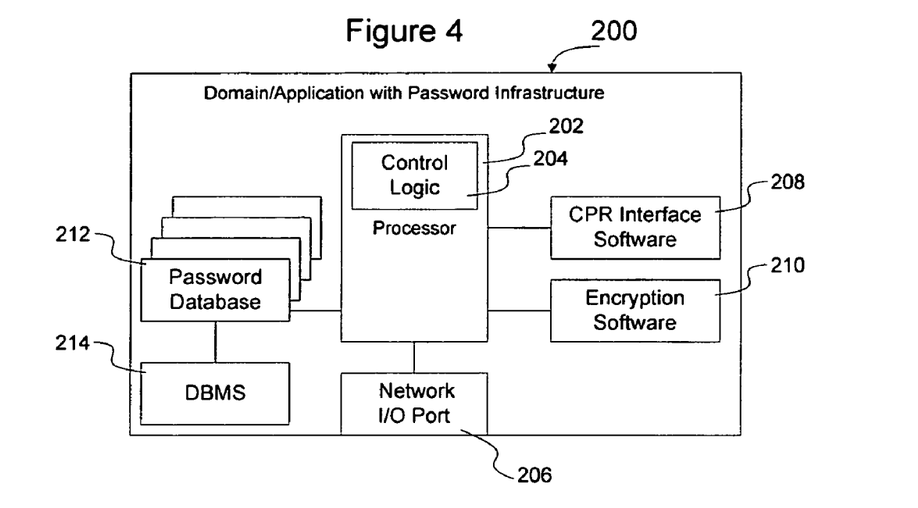
FIG. 4 is a functional block diagram of an example of a system network device that is configured to communicate with the CPR of FIG. 4 while maintaining its own password infrastructure.

FIG. 4 illustrates a system network device configured to interact with the CPR network device of FIG. 3, and which is configured to maintain its own password infrastructure. The system network device of FIG. 4 may be a domain host, application host, password infrastructure host, or any other network device on the domain or associated with the application.

As shown in FIG. 4, the system network device 200 includes a processor 202 having control logic 204 configured to implement the functions ascribed to it as described above in connection with FIGS. 1-2. The system network device 200 also includes network I/O ports 206 configured to enable it to communicate over the network with the CPR 12. Interactions with the CPR 12 may be facilitated via CPR interface software 208 configured to run on processor 202. Optionally, encryption software 210 may be included to accelerate encryption operations associated with interfacing to the CPR. A password database 212 and associated DBMS 214 is provided to maintain the local database infrastructure for the domain or application on the system network device 200.

Figure 5:
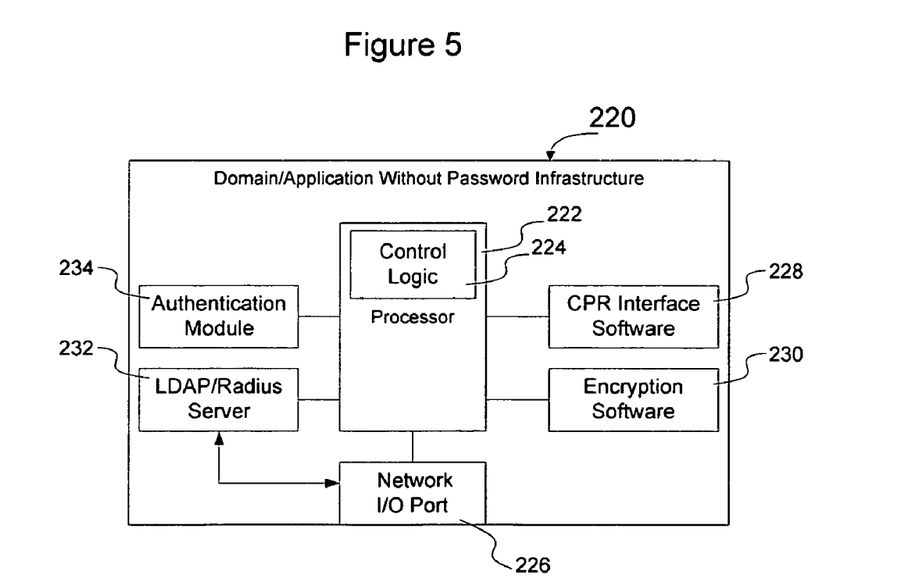
FIG. 5 is a functional block diagram of an example of a system network device that is configured to communicate with the CPR of FIG. 4 without maintaining its own separate password infrastructure.

FIG. 5 illustrates a system network device configured to interact with the CPR network device of FIG. 3, and which is not configured to maintain a separate password database. The system network device of FIG. 5 may be a domain host, application host, or any other network device on the domain or associated with the application.

As shown in FIG. 5, the system network device 220 includes a processor 222 having control logic 224 configured to implement the functions ascribed to it as described above in connection with FIGS. 1-2. The system network device 220 also includes network I/O ports 226 configured to enable it to communicate over the network with the CPR 12. Interactions with the CPR 12 may be facilitated via CPR interface software 228 configured to run on processor 222. Optionally, encryption software 230 may be included to accelerate encryption operations associated with interfacing to the CPR. A LDAP/RADIUS server 232 and/or authentication module 234 are provided to perform authentication requests to the CPR 12.

The control logic 152, 204, 224 may be implemented as a set of program instructions that are stored in a computer readable memory within the network device and executed on a microprocessor within the network device. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of securely synchronizing password databases on a network, the method comprising the steps of:

performing password services by a Central Password Repository network device comprising a hardware processor upon receipt of inquiries from domains and applications without password databases; and identifying, by the CPR network device, password databases implemented by domains and applications on the network to accept access by an user; and for each said identified password database, establishing by the CPR network device an encrypted and authenticated communication session between the CPR network device and the identified password database, the encrypted and authenticated communication session relying on an authentication level of an user's password in the CPR network device, the step of establishing the encrypted and authenticated communication session comprising determining the authentication level of the user's password and requiring the authentication level of the user's password to be at least as strict as an authentication level enforced by the identified password database when the identified password database determines whether to admit the user to access a domain or application associated with the identified password database, and when the authentication level of the user's password is at least as strict as the authentication level enforced by the identified password database when the identified password database determines whether to admit the user to access the domain or application associated with the identified password database, enforcing a password change on the identified password database by the CPR network device by performing a reset function on the identified password database by the CPR network device to cause a previous password associated with the user on the identified password database to be changed without requiring submission to the identified password database of the previous password associated with the user on the identified password database.

2. The method of claim 1, wherein the encrypted and authenticated communication session is authenticated to a level specified by the identified password database.

3. The method of claim 1, wherein the step of performing password services comprises responding, by the CPR network device, to requests to authenticate users from the domains and applications without identified password databases.

4. The method of claim 3, wherein the step of performing password services comprises responding to at least one of LDAP-BIND requests by the CPR network device and responding to RADIUS requests by the CPR network device.

5. The method of claim 1, wherein the step of identifying password databases on the network comprises polling known password databases on the network to determine when the user has network privileges through the identified password database.

6. A non-transitory computer readable storage medium having stored thereon a computer program for implementing a Central Password Repository (CPR), the computer program comprising a set of instructions which, when executed by a computer, cause the computer to perform a method comprising the steps of:

performing password services by the CPR upon receipt of inquiries from domains and applications without password databases; and identifying, by the CPR, password databases implemented by domains and applications on the network to accept access by an user; and identifying, by the CPR, password databases implemented by domains and applications on the network to accept access by an user; and for each said identified password database, establishing by the CPR an encrypted and authenticated communication session between the CPR and the identified password database, the encrypted and authenticated communication session relying on an authentication level of an user's password in the CPR, the step of establishing the encrypted and authenticated communication session comprising determining the authentication level of the user's password and requiring the authentication level of the user's password to be at least as strict as an authentication level enforced by the identified password database when the identified password database determines whether to admit the user to access a domain or application associated with the identified password database, and when the authentication level of the user's password is at least as strict as the authentication level enforced by the identified password database when the identified password database determines whether to admit the user to access the domain or application associated with the identified password database, enforcing a password change on the identified password database by the CPR by performing a reset function on the identified password database by the CPR to cause a previous password associated with the user on the identified password database to be changed without requiring submission to the identified password database of the previous password associated with the user on the identified password database.

7. The non-transitory computer readable storage medium of claim 6, wherein the step of performing password services is implemented using a LDAP/RADIUS server.

8. The non-transitory computer readable storage medium of claim 6, the method further comprising the step of implementing a web server to provide at least one of XML and HTTP documents to interface the user to the CPR.

* * * * *